(12) United States Patent
Chen et al.

(10) Patent No.: US 12,606,706 B2
(45) Date of Patent: Apr. 21, 2026

(54) HIGH DISPENSING RATE, HIGH THERMAL CONDUCTIVITY SILICONE THERMAL GEL WITH VERTICAL STABILITY AND NO CRACKING

(71) Applicant: Nano and Advanced Materials Institute Limited, Hong Kong (HK)

(72) Inventors: Xiaohua Chen, Hong Kong (HK); Jinliang Zhao, Hong Kong (HK); Chi Ho Kwok, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 104 days.

(21) Appl. No.: 18/393,726

(22) Filed: Dec. 22, 2023

(65) Prior Publication Data

US 2025/0206949 A1     Jun. 26, 2025

(51) Int. Cl.
| | |
|---|---|
| *B29C 64/00* | (2017.01) |
| *C08J 3/20* | (2006.01) |
| *C08K 3/22* | (2006.01) |
| *C08K 3/28* | (2006.01) |
| *C08K 5/5419* | (2006.01) |
| *C08L 83/06* | (2006.01) |

(52) U.S. Cl.
CPC ................. *C08L 83/06* (2013.01); *C08J 3/20* (2013.01); *C08K 3/22* (2013.01); *C08K 3/28* (2013.01); *C08K 5/5419* (2013.01); *C08J 2383/07* (2013.01); *C08K 2003/2227* (2013.01); *C08K 2003/282* (2013.01); *C08K 2201/001* (2013.01)

(58) Field of Classification Search
CPC .................................... C08L 83/06; C08J 3/20
See application file for complete search history.

(56) References Cited

U.S. PATENT DOCUMENTS

| | | | |
|---|---|---|---|
| 10,708,979 B2 | 7/2020 | Bratianu-Badea et al. | |
| 10,955,881 B2 | 3/2021 | Gopalakrishna et al. | |
| 2007/0238317 A1* | 10/2007 | Allen ..................... | B05D 3/067 |
| | | | 438/778 |
| 2010/0200801 A1 | 8/2010 | Ramasamy et al. | |
| 2011/0177342 A1* | 7/2011 | Itoh .......................... | C08J 7/043 |
| | | | 427/527 |

(Continued)

FOREIGN PATENT DOCUMENTS

| | | |
|---|---|---|
| CN | 113755015 A | 12/2021 |
| WO | 2005024942 A1 | 3/2005 |

(Continued)

*Primary Examiner* — Nicholas Krasnow
(74) *Attorney, Agent, or Firm* — IDEA Intellectual Limited; Sam T. Yip

(57)     ABSTRACT

The present invention relates to a single-part thermal polysiloxane gel which demonstrates remarkable vertical stability, thermal conductivity, and rapid dispensing rate. The present invention is characterized by its polysiloxane polymer network formed by reaction of the components upon mixing, which enables embedding of thermally conductive fillers to further enhance the overall thermal conductivity of the gel, while not compromising in vertical stability. The thermal gel of the present invention is therefore highly suitable for application of electronics and electrical vehicle usage, which may involve high temperature and vertical positioning conditions.

9 Claims, 13 Drawing Sheets

(56)     References Cited

U.S. PATENT DOCUMENTS

2013/0012087 A1*   1/2013  Itoh ......................... C08J 5/249
                                                        428/447
2014/0339780 A1    11/2014  Mazyar et al.
2016/0002524 A1*   1/2016  Shimizu ................. G02C 7/102
                                                        252/586
2016/0223269 A1    8/2016  Hartmann et al.
2020/0385624 A1    12/2020  Zekriardehani et al.
2020/0386305 A1    12/2020  Gilliland et al.

FOREIGN PATENT DOCUMENTS

WO        2006023860  A2    3/2006
WO        2019138361  A1    7/2019
WO        2020046873  A1    3/2020
WO        2020157550  A1    8/2020
WO        2023092530  A1    6/2023

* cited by examiner

HIGH DISPENSING RATE, HIGH THERMAL CONDUCTIVITY SILICONE THERMAL GEL WITH VERTICAL STABILITY AND NO CRACKING

FIELD OF THE INVENTION

The present invention relates to an optimized formulation of thermal gel. In particular, the thermal gel is single-part and curable, demonstrates high thermal conductivity, vertical stability and no pin-holes formation during vertical applications.

BACKGROUND

With the increasing variety of electronic appliances, machinery and vehicles, heat dissipation becomes a concern of paramount importance. Electronic components, for example integrated circuits and processors, usually have an optimal operation temperature range, which if the temperature is elevated due to heating to have exceeded the higher end of the optimal temperature range, may result in a degradation of the performance of the electronic components.

If an electronic component is under heating over a long period of time, the high temperature may accelerate the aging process of the electronic components, thereby increasing its risk of failure. Therefore, heat dissipation is important in maintaining the longevity and performance reliability of the electronic devices.

Heat dissipation is also crucial for electronic components in terms of energy efficiency. More power is generally required to maintain the functionality of an electronic device if it is operating under a high temperature.

In appliances or vehicles where the working temperature variation may be relatively extreme, heat dissipation is of particularly significance for the electronic components within the appliance or vehicle to ensure relatively consistent performance regardless of the varying conditions.

As such, silicone gel with high heat conductivity is gaining popularity as its adhesive properties and heat conductivity can ensure structural integrity of the electronic appliances, as well as effective heat dissipation.

However, since the operation or charging of an electronic device may necessitate a vertically upright or inclined configuration of the electronic components within (or even the entirety of the electronic device), the heat conductive silicone gel would be subject to the gravitational forces. As such, the "vertical fall" of the thermal gels, which enhances the structural properties of the thermal gels under gravitational forces, is of utmost significance to maintain structural and mechanical integrity.

However, the prior art silicone compositions are either falling short in terms of not being able to achieve high thermal conductivity, or the occurrence of cracks when subject to vertical configuration. To achieve high thermal conductivity, a high fillers loading is needed, however, high filler loading would reduce the tackiness of thermal gel, resulting in crack and fall off during operation.

Thus, there is a need to improve the silicone formulation to achieve mechanical integrity after subjecting to vertical fall, while also demonstrating high thermal conductivity, and is single-part, curable and easy to handle. The present invention addresses this need.

SUMMARY OF THE INVENTION

Addressing the above technical insufficiencies, the present invention provides a single-part, curable thermal polysiloxane gel, which is curable and demonstrates high thermal conductivity, high vertical stability and high dispense rate, which is suitable for electronic vehicles and charging systems which enable vertical latching onto a surface for the charging process of electronic appliances in a vertical upright position.

In one aspect, the present invention provides a thermal polysiloxane gel which comprises vinyl-functionalized silicone polymer base, silyl-hydride functionalized polysiloxane crosslinker; thermally conductive filler; and methacryloxypropyl/polyethene glycol polyhedral silsesquioxanes.

The vinyl-functionalized silicone polymer base, silyl-hydride functionalized polysiloxane crosslinker and methacryloxypropyl/polyethene glycol-functionalized polyhedral silsesquioxanes would react upon mixture to form a three-dimensional polymer network. It is a crucial feature of the present invention that the three-dimensional network structure has gaps large enough to allow thermally conductive fillers to be embedded in the network through thermal curing process to further enhance the thermal conductivity of the silicone, while still maintaining its high vertical stability.

It is a distinctive feature that the thermal gel in the present invention comprises dual-functionalized polyhedral silsesquioxanes comprising methacryloxypropyl and polyethene glycol functional groups. Preferably, the ratio of methacryloxypropyl-functionalized groups to polyethene glycol-functionalized groups is 1:3 to 4:1.

The present invention is also characterized by its high loading of thermally conductive filler, which amounts to an amount of over 90 wt %.

The thermal conductivity of the single-part curable thermal polysiloxane gel is at a level of higher than 6.0 W/m·K.

The single-part curable thermal polysiloxane gel exhibits a high dispense rate of at least 10 g/min under 90 psi pressure single-part curable thermal polysiloxane gel.

The vertical stability of the single-part curable thermal polysiloxane gel is remarkable, with the vertical fall of the silicone smaller than 2 mm over a period of time of 100 hours at 150° C. of subjecting to vertical position.

The thermally conductive filler which is infused into the polymer network through thermal curing process may be selected from $Al_2O_3$, AlN, BN, $SiO_2$, ZnO, MgO, diamond or any combination thereof.

In another aspect of the present invention, a method for preparing the single-part curable thermal polysiloxane gel is provided herewith. The thermally conductive fillers are mixed to homogeneity and processed with silane coupling agent, and is subsequently added to the silicone base which were mixed with vinyl-functionalized silicone polymer base and silyl-hydride functionalized polysiloxane crosslinker. The fillers and silicone base are mixed at vacuum condition. The methacryloxypropyl polythene glycol polyhedral silsesquioxanes is added to the silicone base-thermally conductive filler powder mixture afterwards, and the whole mixture is further mixed at vacuum condition.

In an embodiment, the ratio of the silicone base to the thermally conductive filler powder is in the range of 1:15 to 1:30.

In another embodiment, the thermal conducive filler is selected from $Al_2O_3$, AlN, BN, $SiO_2$, ZnO, MgO, diamond or any combination thereof.

BRIEF DESCRIPTION OF THE DRAWINGS

FIG. 1A corresponds to Methacryl PEG POSS (POSS 31), FIG. 1B corresponds to Methacryl PEG POSS (POSS 13) and FIG. 1C corresponds to Methacryl POSS cage mixture (M POSS).

FIG. 2A shows the thermal gels of samples C.E 1, C.E 2 and C.E.3 at the start of the test; and FIG. 2B shows the thermal gels of them 100 hours after the start of the test.

FIG. 3A shows the thermal gels of samples E1, E2 and E3 at the start of the test; and FIG. 3B shows the thermal gels of them 100 hours after the start of the test.

FIG. 4A shows the thermal gels of samples C.E 4 and C.E 5 at the start of the test; and FIG. 4B shows these thermal gels 100 hours after the start of the test.

FIG. 5A shows the thermal gels of samples C.E 6 and C.E 7 at the start of the test; and FIG. 5B shows the thermal gels of samples C.E 6 and C.E 7 100 hours after the start of the test.

FIG. 6A shows the thermal gels of sample C.E 8, C.E 9, C.E10 and C.E 11 at the start of the test; FIG. 6B shows the thermal gels of them 100 hours after the start of the test.

DETAILED DESCRIPTION

Figure 1A:
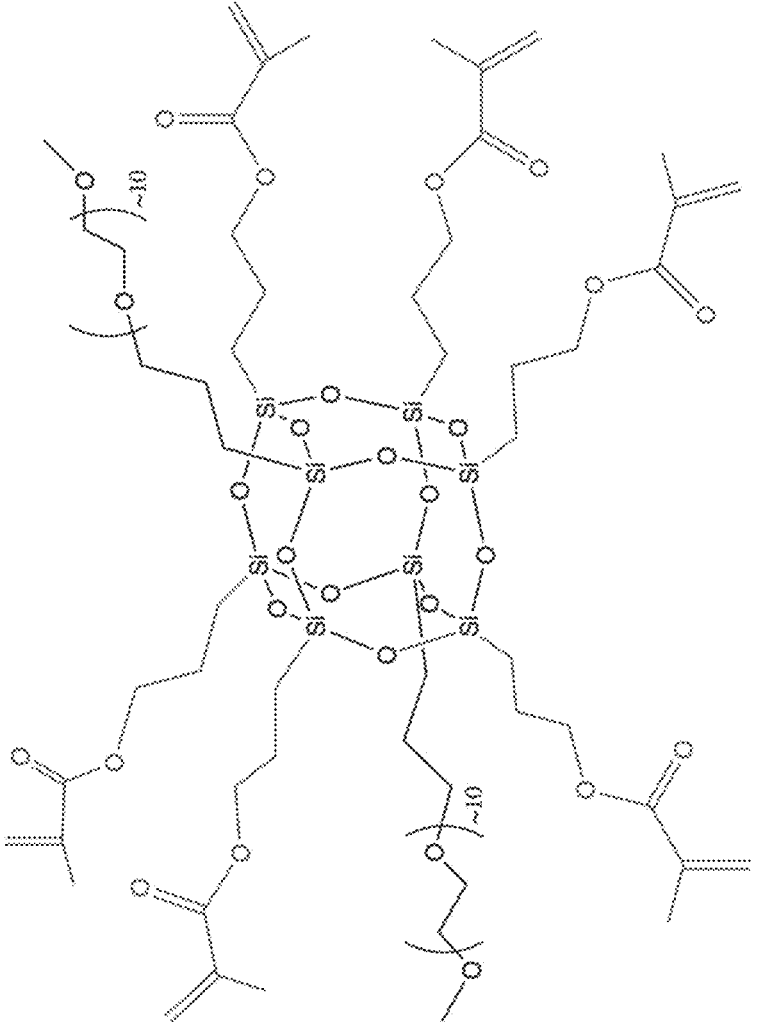
FIGS. 1A, 1B and 1C show the chemical formula and structure of methacryloxypropyl polythene glycol polyhedral silsesquioxanes of the present invention.
Figure 1B:
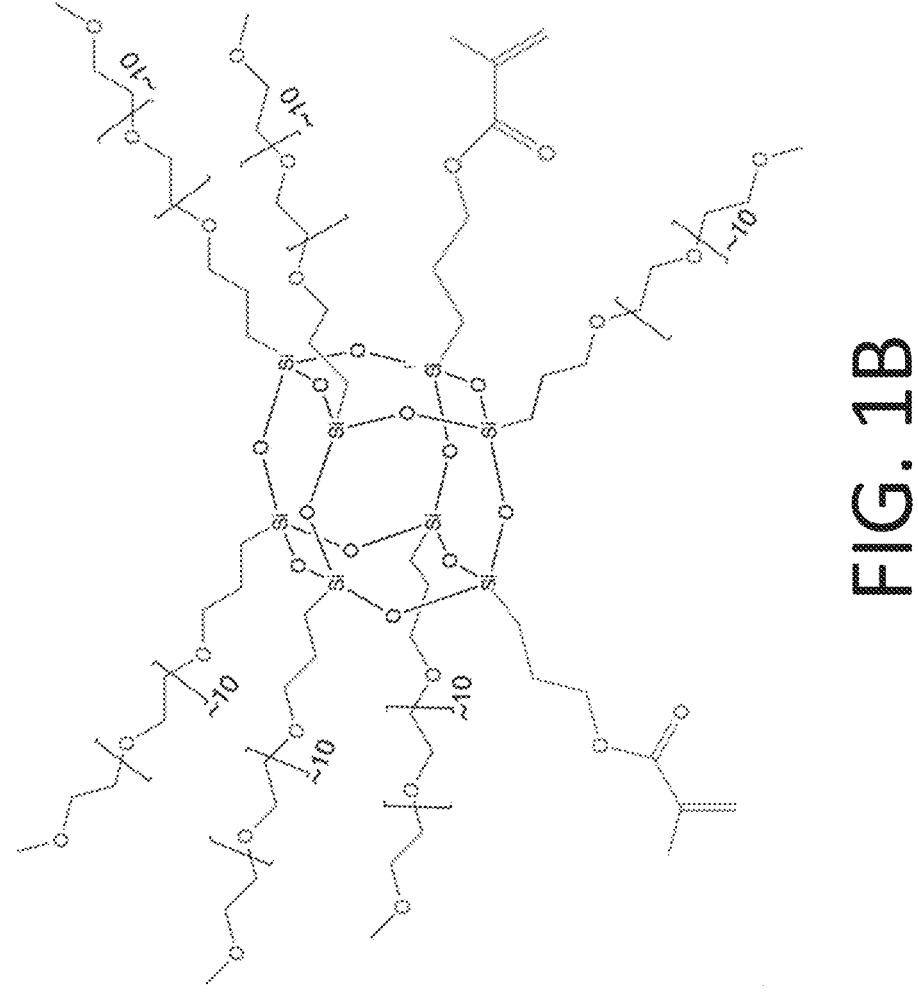
Figure 1C:
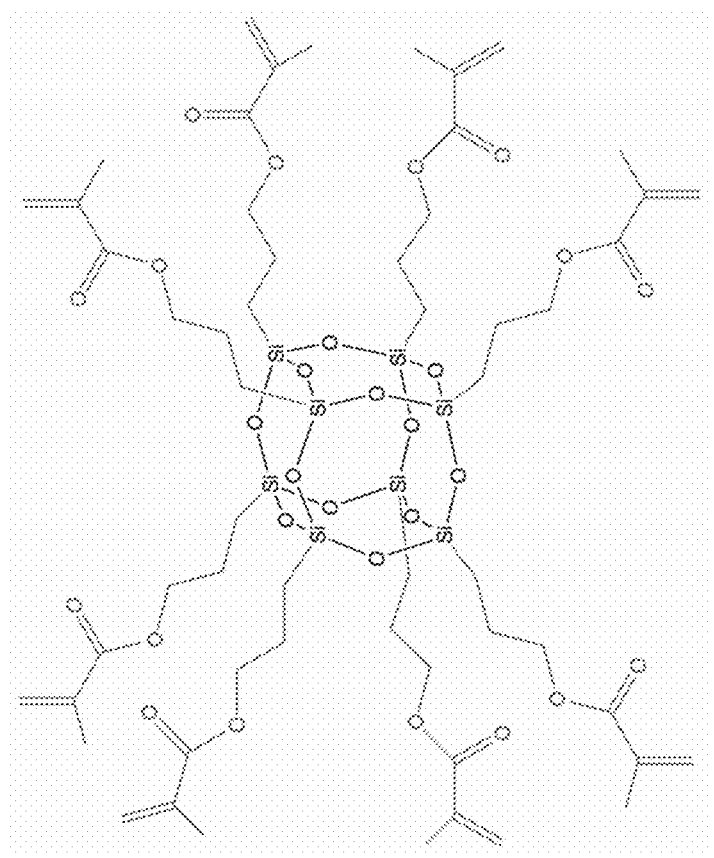

The present invention relates to a single-part thermal polysiloxane gel, which demonstrates greatly improved vertical stability, thermal conductivity and rapid dispense rate.

The thermal polysiloxane gel of the present invention comprises vinyl-functionalized silicone polymer base, silyl-hydride functionalized polysiloxane crosslinker, thermally conductive filler and dual-functionalized polyhedral silsesquioxanes comprising methacryloxypropyl and polyethene glycol functional groups.

The above components, when combined, react synergistically to form a three-dimensional polymer network, which further allows the embedding of thermally conductive fillers into the network through a thermal curing process. The present invention is also characterized by the high loading of thermally conductive fillers, constituting at least 90 wt % of the thermal gel. The ratio of the silicone polymer base to the thermally conductive filler ranges from 1:15 to 1:30.

The above in turn enhances the thermal conductivity of the thermal polysiloxane gel, reaching a meaning of 6.0 W/m·K.

The thermal polysiloxane gel of the present invention also displays significant vertical stability, defined as its resistance against vertical sliding or sagging when it is subjected to a vertical position. The vertical fall of the thermal polysiloxane gel of the present invention, as tested and defined under the method described in Paragraph below, is less than 2 mm, thereby demonstrating its remarkable vertical stability.

The thermally conductive filler can be selected from one or more of $Al_2O_3$, AlN, BN, $SiO_2$, ZnO, MgO or diamond.

The following examples demonstrate the methods of preparing the thermal gels, and the optimization of thermal gel performances.

For the purposes of the following examples, vertical stability tests were conducted by fixing the gels under test between two glass plates, with the fixed gel having a diameter of 30 mm and thickness of 2 mm, as fixed by a stain steel frame, and free space is kept above and below the gel. An outline of the gel is drawn on the glass plate to indicate the original position. The fixture is then vertically oriented in an oven at a temperature of 150° C. for a specified period of time. The gel is defined to have passed the vertical test if the vertical slip is less than 10% apart from its original position, and no significant visible crack is observed after the test.

EXAMPLES

Example 1—Procedures for Thermal Gel Preparation

Thermally conductive fillers, and in the form of powder, is mixed with an acoustic mixer for 2 minutes to obtain a homogeneous powder mixture.

Silane coupling agent is further added to the mixed powder, and is mixed using an acoustic mixer again for 2 minutes.

The vinyl-hydride silicone base was mixed with vinyl-functionalized silicone polymer base and silyl-hydride functionalized polysiloxane crosslinker using a planetary mixer for 5 min at a vacuum condition.

The vinyl-hydride silicone base is added to the mixed powder prepared above, and mixed at vacuum condition with a planetary mixer.

The polyhedral silsesquioxanes (POSS) is further added to the silicone base-filler mixture, and is further mixed at vacuum condition with a planetary mixer to obtain the thermal gel.

Example 2—Thermal Gel Optimization

Example 2.1—Ingredients for Optimization Testing

Tables 1 below shows the formulations of the vinyl-hydride silicone base, TT12.

TABLE 1

| (TT12): | | |
| --- | --- | --- |
| Base | Mass (g) | Wt % |
| vinyl-functionalized silicone polymer base A | 8.4 | 40 |

TABLE 1-continued

| (TT12): | | |
| --- | --- | --- |
| Base | Mass (g) | Wt % |
| vinyl-functionalized silicone polymer base B | 2.4 | 14.29 |
| silyl-hydride functionalized polysiloxane crosslinker | 6 | 35.71 |
| Total | 16.8 | 100 |

Table 2 below shows the formula of the thermally conductive filler used in the optimization tests.

TABLE 2

| Tc filler | AlN30 | Al2O3 | AlN2 | AlN120 |
| --- | --- | --- | --- | --- |
| Weight (g) | 3.76 | 6.25 | 3.75 | 11.25 |

The filler formula is further subject to silane coupling agent treatment to improve its compatibility with silicone base, which the amount of silane coupling agent is controlled to be a constant level of 0.75 wt %.

Example 2.2—Thermal Gels Without POSS

Table 6 shows the compositions and properties of the thermal gel samples without POSS added, which are subjected to vertical stability testing of temperature 150° C. and vertical placement over time.

TABLE 3

| Sample | Silicone base formula | Ratio (silicone base:filler) | Tc (W/m · K) | Dispense rate @90 psi (g/min) | Vertical fall results 2 mm 150° C. |
| --- | --- | --- | --- | --- | --- |
| C.E 1 | TT12 | 1:16.7 | 6.740 | 10 | Pass |
| C.E 2 | TT12 | 1:16.7 | 6.750 | 13 | Failed |
| C.E 3 | TT12 | 1:16.7 | 7.238 | 12 | Failed |

Figure 2A:
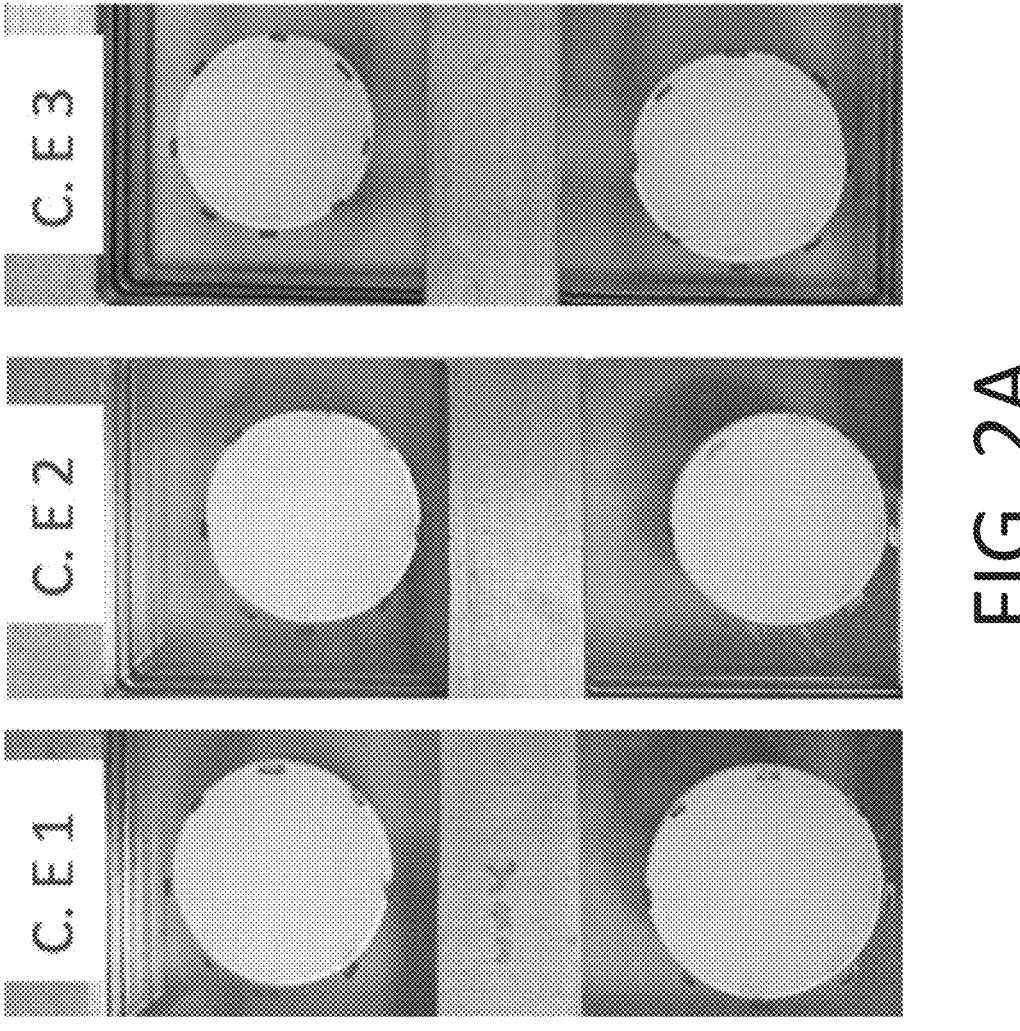
FIGS. 2A and 2B shows the vertical stability results of thermal gels with the silicone polymer base TT12 and thermally conductive filler of the present invention but without the addition of polyhedral silsesquioxanes (POSS) with different dispense rates, under 150° C. temperature and vertical placement.
Figure 2B:
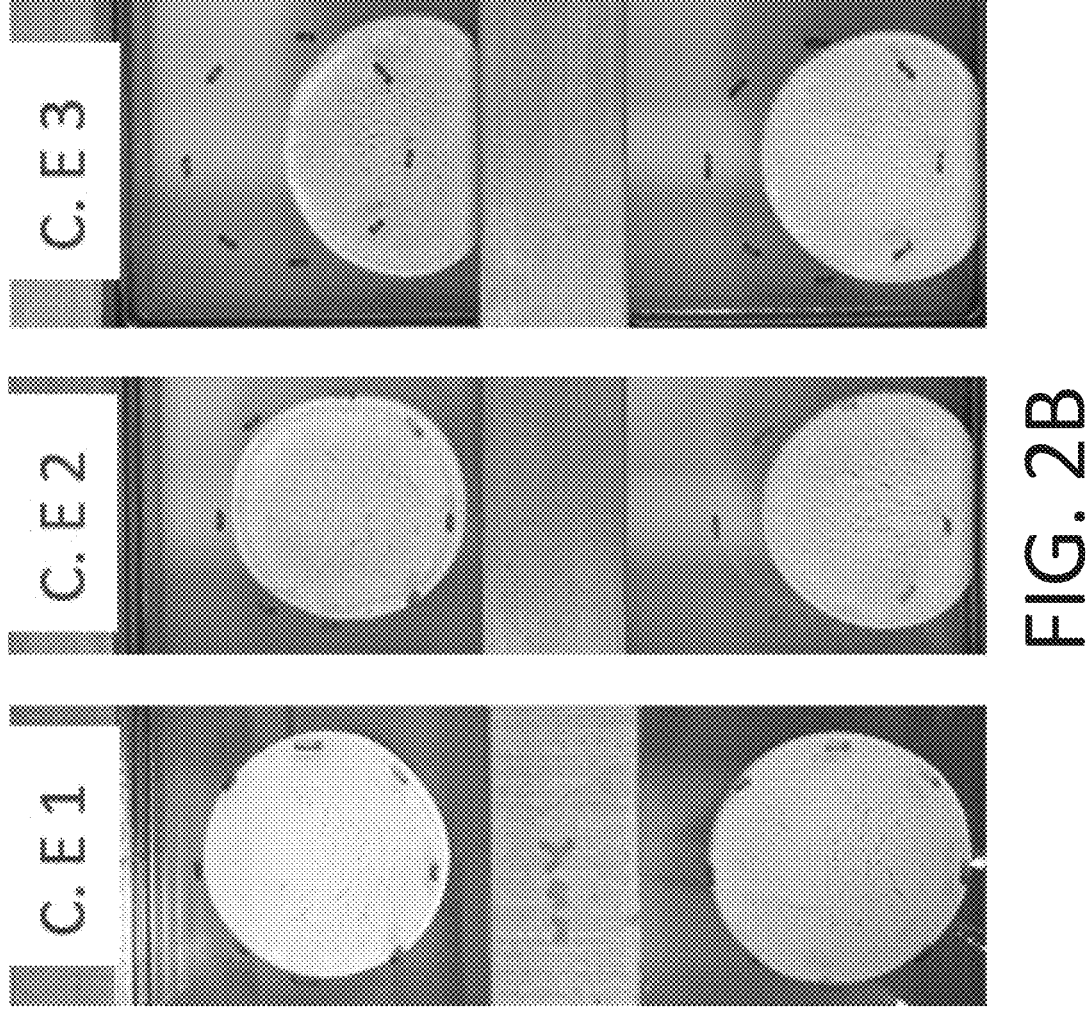

FIGS. 2A and 2B shows the samples C.E 1, C.E 2 and C.E 3 at the start of the test, and 100 hours after vertical testing at 150° C. respectively.

Vertical slip occurred in half of the samples subjected to the test, yet all samples remained intact without fractures. All samples can be kneaded to restore mechanical integrity.

Example 2.3—Thermal Gels with POSS 31

Table 4 shows the compositions and properties of the thermal gel samples with Methacryl PEG POSS ("POSS 31") added, which are subjected to vertical stability testing of temperature 150° C. and vertical placement over time.

TABLE 4

| Sample | Silicone base formula | Ratio (silicone base:filler) | Tc (W/m · K) | Dispense rate @90 psi (g/min) | Vertical fall results 2 mm 150° C. |
| --- | --- | --- | --- | --- | --- |
| E 1 | TT12 + 2% POSS 31 | 1:16.7 | 6.575 | 15 | Pass |
| E 2 | TT12 + 2% POSS 31 | 1:16.7 | 6.551 | 17 | Pass |

TABLE 4-continued

| Sample | Silicone base formula | Ratio (silicone base:filler) | Tc (W/m · K) | Dispense rate @90 psi (g/min) | Vertical fall results 2 mm 150° C. |
| --- | --- | --- | --- | --- | --- |
| E 3 | TT12 + 2% POSS 31 | 1:16.7 | 6.545 | 16 | Pass |

Figure 3A:
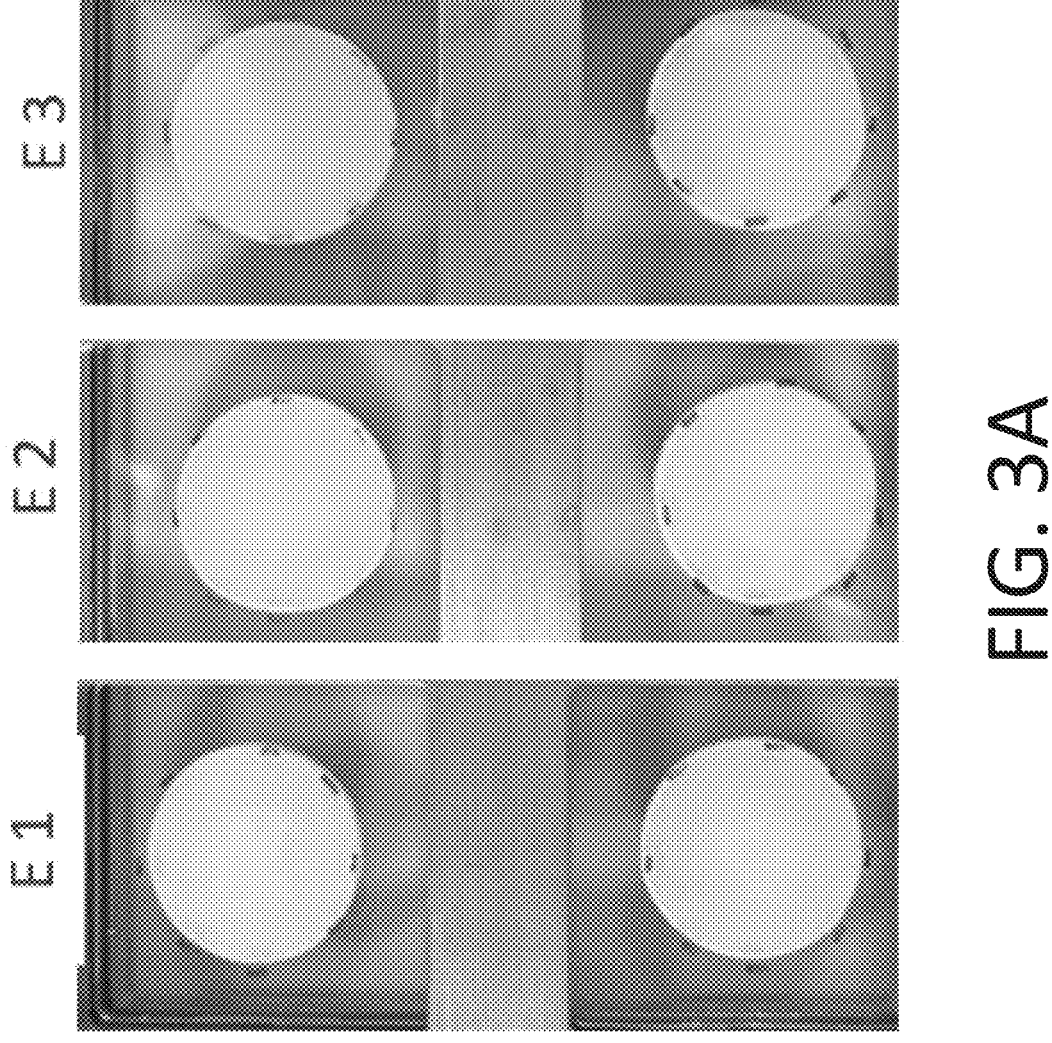
FIGS. 3A and 3B shows the vertical stability results of thermal gel with the silicone polymer base TT12 and thermally conductive filler of the present invention, with the addition of POSS 31, under 150° C. temperature and vertical placement.
Figure 3B:
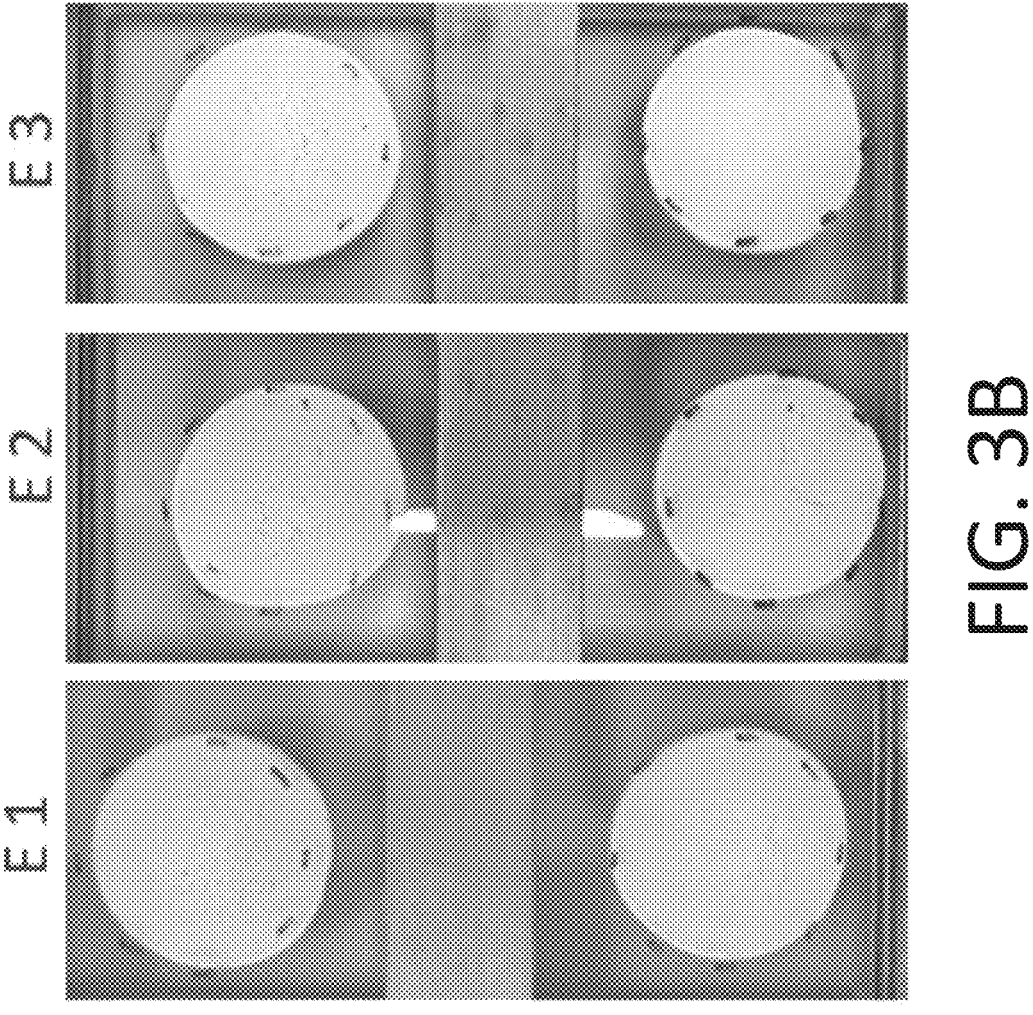

FIG. 3A and FIG. 3B show the samples of E1, E2 and E3 at the start of the test and 100 hours after vertical stability testing at 150° C. respectively.

After 100 hours of testing, samples displayed no vertical slip and fractures. All samples can be kneaded to restore mechanical integrity.

It is therefore observed that the inclusion of POSS 31 improves vertical slip prevention of the thermal gels.

Example 2.4—Thermal Gels with Increased Amount of POSS 31

Table 5 shows the compositions and properties of the thermal gel samples with increased amounts of POSS 31 added, which are subjected to vertical stability testing of temperature 150° C. and vertical placement over time.

TABLE 5

| Sample | Silicone base formula | Ratio (silicone base:filler) | Tc (W/m · K) | Dispense rate @90 psi (g/min) | Vertical fall results 2 mm 150° C. |
| --- | --- | --- | --- | --- | --- |
| C.E 4 | TT12 + 4.5% POSS 31 | 1:16.7 | 6.861 | 17.5 | Failed (fractures) |
| C.E 5 | TT12 + 4.5% POSS 31 + Pt | 1:16.7 | 6.457 | 8 | Failed (fractures) |

Figure 4A:
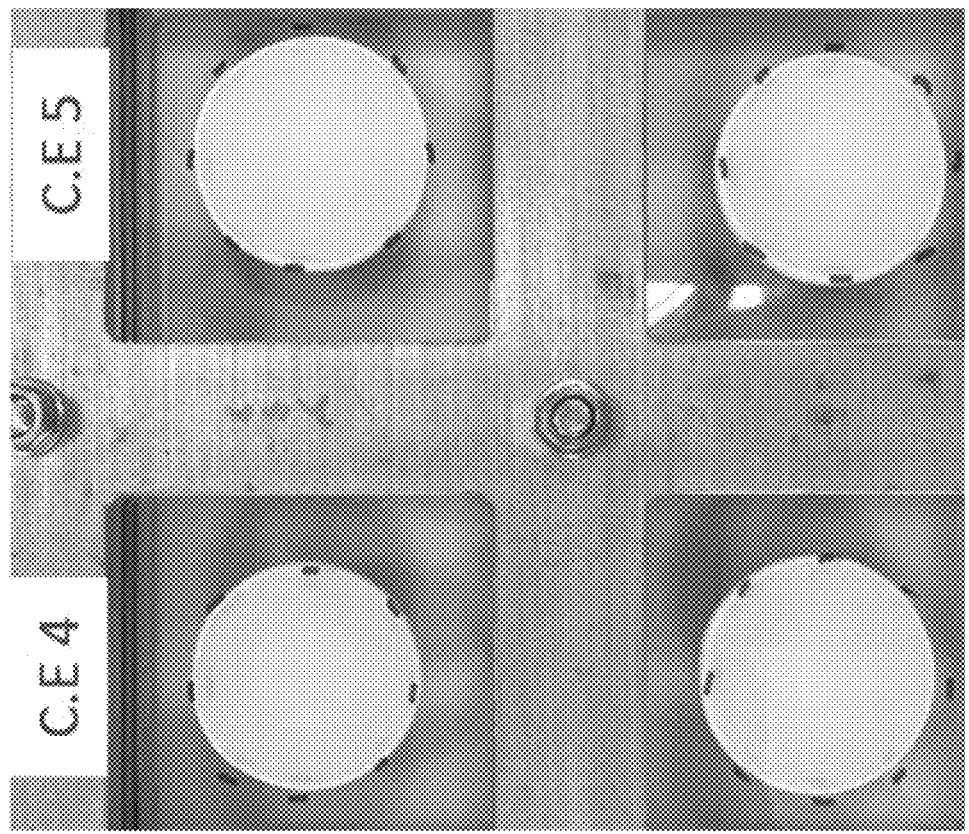
FIGS. 4A and 4B shows the vertical stability results of thermal gel with the silicone polymer base TT12 and thermally conductive filler of the present invention, with the addition of higher amounts of POSS 31 with different dispense rates, under 150° C. temperature and vertical placement.
Figure 4B:
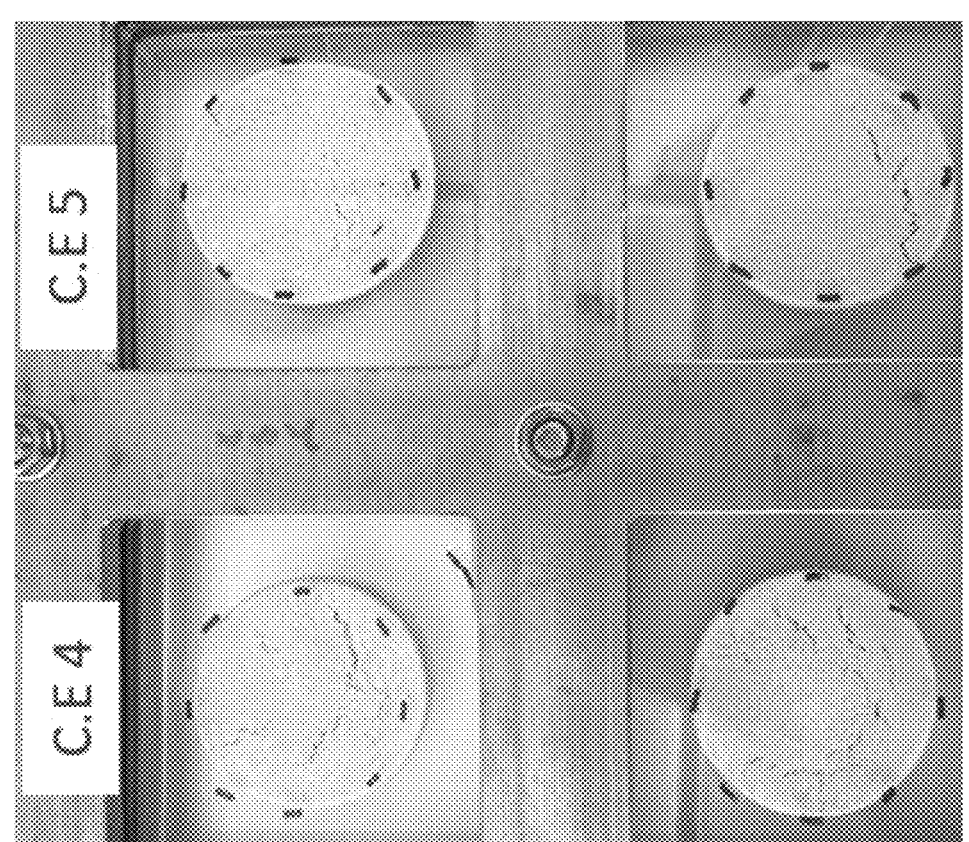

The comparison of the samples C.E 4 and C.E 5 at the start of the test and 100 hours after the test can be seen in FIGS. 4A and 4B respectively.

All samples did not show vertical slip after 100 hours. However, all samples showed fractures after 100 hours of testing.

The experimental results are in line with Example 2.3 above that adding in POSS 31 improves the vertical slip prevention of thermal gels, in which the POSS 31 reacts with the silicone base. However, if the content of POSS 31 exceeds 2%, there is a tendency for the resulting thermal gel to be brittle and more easily fractured.

Example 2.5—Thermal Gels with POSS 13

Table 6 shows the compositions and properties of the thermal gel samples with Methacryl PEG POSS (POSS 13) added, which are subjected to vertical stability testing of temperature 150° C. and vertical placement over time.

TABLE 6

| Sample | Silicone base formula | Ratio (silicone base:filler) | Tc (W/m · K) | Dispense rate @90 psi (g/min) | Vertical fall results 2 mm 150° C. |
| --- | --- | --- | --- | --- | --- |
| C.E 6 | TT12 + 2% POSS 13 | 1:16.7 | 6.837 | 18 | Failed |
| C.E 7 | TT12 + 2% POSS 13 | 1:16.7 | 7.150 | 17 | Failed |

Figure 5A:
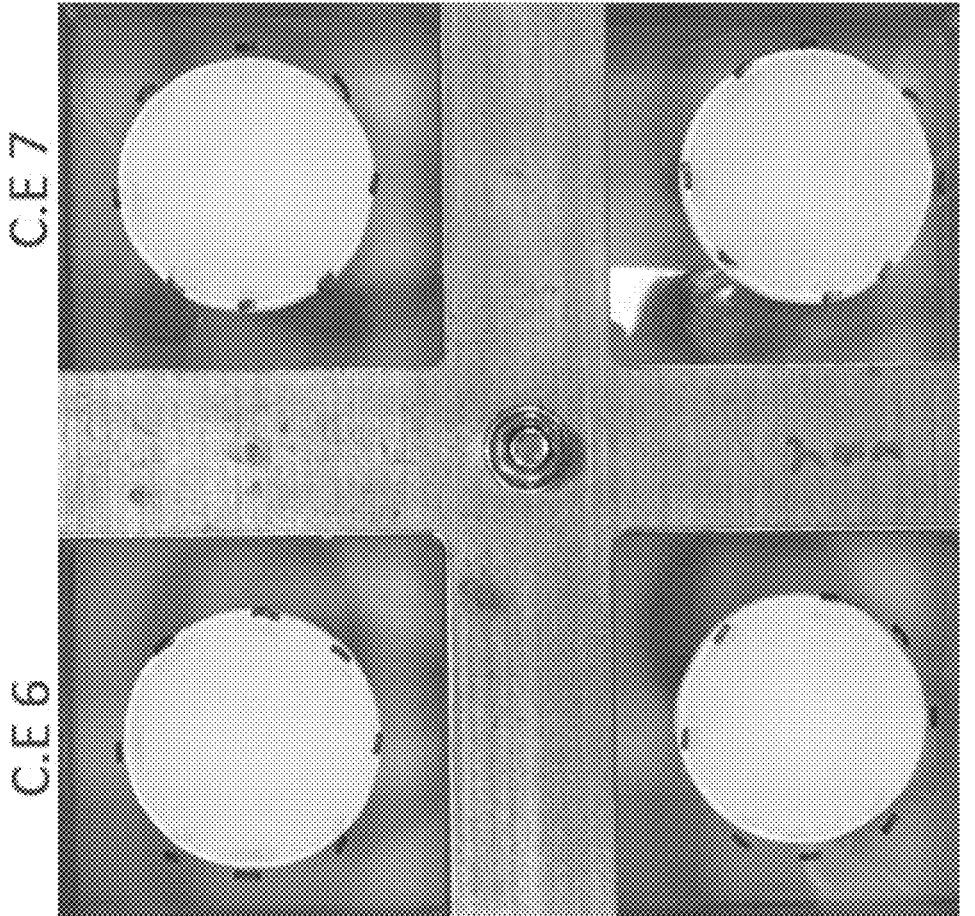
FIGS. 5A and 5B shows the vertical stability results of thermal gel with the silicone polymer base TT12 and thermally conductive filler of the present invention, with the addition of another formulation of POSS (POSS 13) under 150° C. temperature and vertical placement.
Figure 5B:
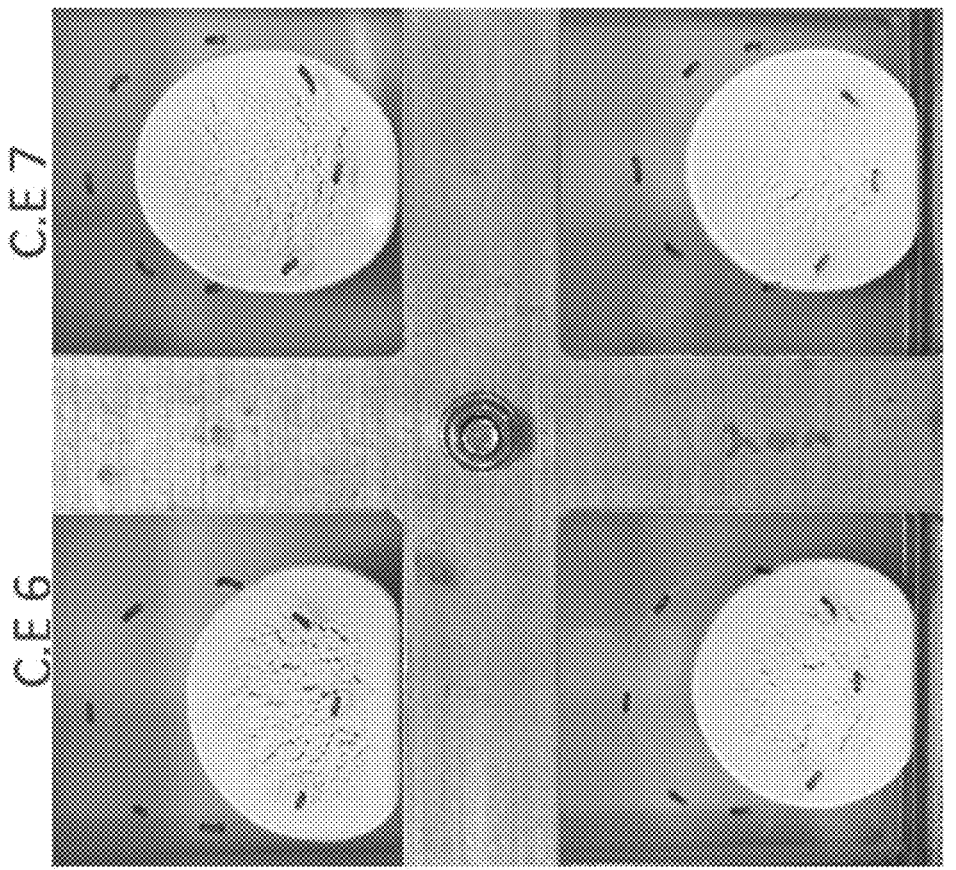

FIGS. 5A and 5B shows samples C.E 6 and C.E 7 at the start of the test and after 100 hours of testing respectively.

All samples did not show signs of fracture; but vertical slip occurred to all samples in the test.

It is therefore concluded that POSS 13, while potentially beneficial in fracture prevention, does not enhance the vertical stability of thermal gels.

Example 2.6—Thermal Gels with M POSS

Table 7 shows the compositions and properties of the thermal gel samples with Methacryl POSS cage mixture (M POSS) added, which are subjected to vertical stability testing of temperature 150° C. and vertical placement over time.

TABLE 7

| Sample | Silicone base formula | Ratio (silicone base:filler) | Tc (W/m · K) | Dispense rate @90 psi (g/min) | Vertical fall results 2 mm 150° C. |
|---|---|---|---|---|---|
| C.E 8 | TT12 + 2% M POSS | 1:16.7 | 6.575 | 14 | Pass |
| C.E 9 | TT12 + 2% M POSS | 1:16.7 | 6.594 | 15 | 1 Pass 1 Failed |
| C.E 10 | TT12 + 2% M POSS | 1:16.7 | 6.509 | 15 | 1 Pass 1 Failed |
| C.E 11 | TT12 + 2% M POSS | 1:16.7 | 6.826 | 13 | Pass |

Figure 6A:
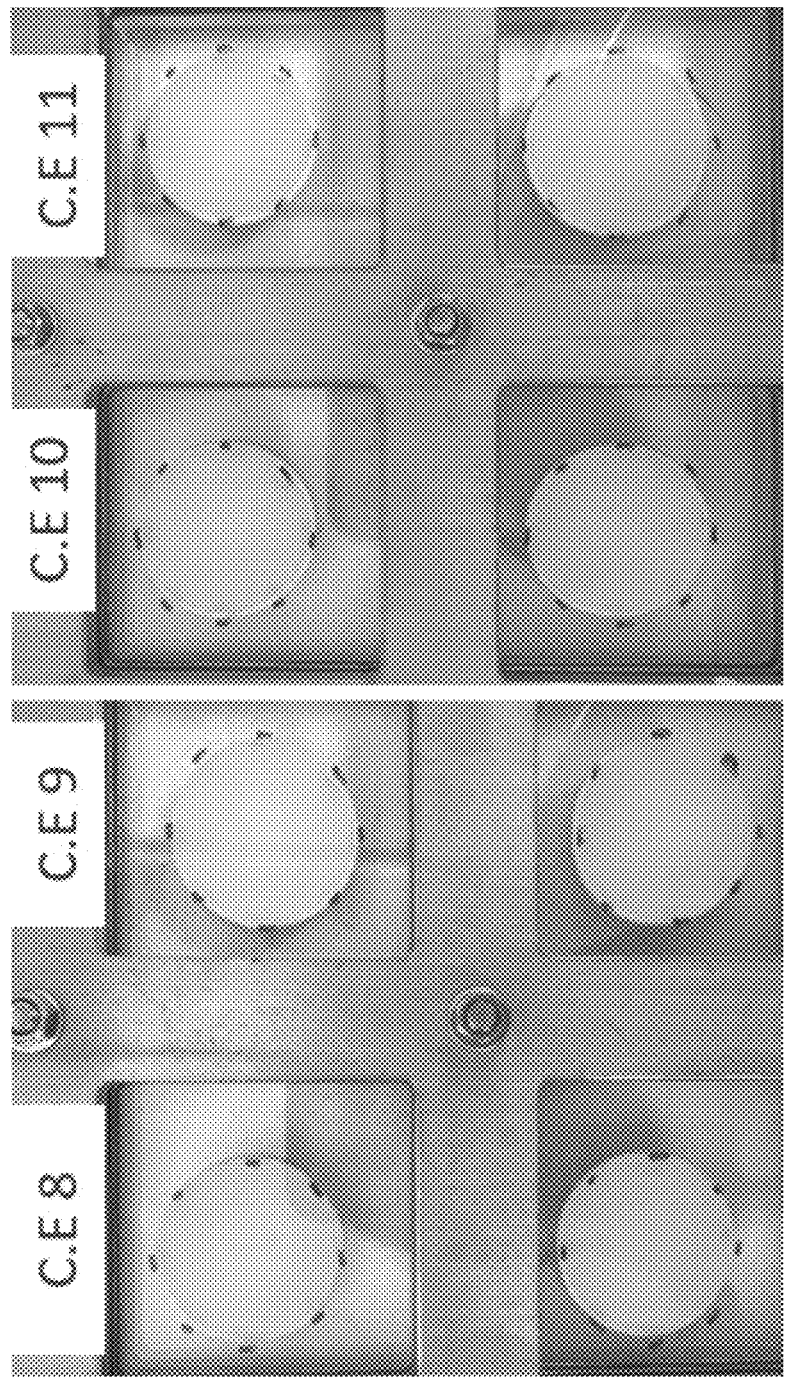
FIGS. 6A and 6B shows the vertical stability results of thermal gel with the silicone polymer base TT12 and thermally conductive filler of the present invention, with the addition of methacryl POSS under 150° C. temperature and vertical placement.
Figure 6B:
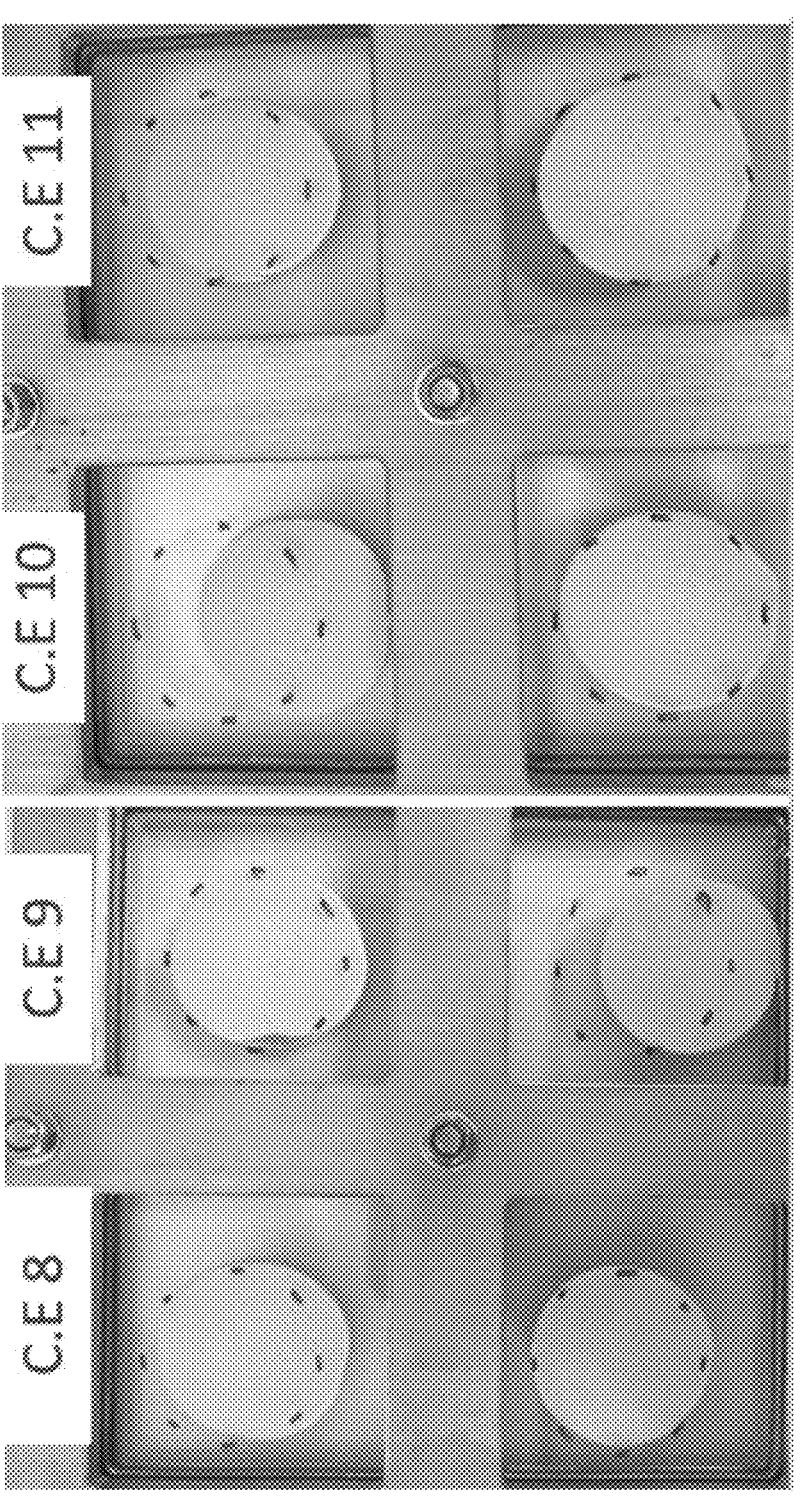

FIG. 6A and FIG. 6B respectively shows the samples of C.E 8, C.E 9, C.E 10 and C.E 11 at the start of the test and after 100 hours of vertical stability testing.

6 of the 8 samples did not display vertical slip post-testing, and no fractures were seen on all samples. Kneading is possible for all samples to restore mechanical integrity.

Therefore, to summarize, the addition of Methacryl PEG POSS (POSS 31) can improve the thermal gel's vertical stability; however, the amount should be less than 2% to prevent brittleness and increased tendency of fracture caused by high concentration of POSS 31, as discussed in Example 2.4 above.

M POSS can be used to improve vertical stability of thermal gels, but only to a partial effect in comparison to POSS 31.

Methacryl PEG POSS (POSS 13), on the other hand, significantly improves the thermal gel's robustness against fracturing; yet vertical stability could not be enhanced.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within +10%, +5%, +1%, or +0.5% of the average of the values.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A vertically-stable, single-part curable, and high dispense rate thermal conductive polysiloxane gel, comprising:
   a vinyl-functionalized silicone polymer base;
   a silyl-hydride functionalized polysiloxane crosslinker;
   a thermally conductive filler; and
   dual-functionalized polyhedral silsesquioxanes comprising methacryloxypropyl and polyethene glycol functional groups;
   wherein the ratio of methacryloxypropyl functional groups to polyethene glycol functional groups in the polyhedral silsesquioxanes is 1:3 to 4:1; and
   wherein the dual-functionalized polyhedral silsesquioxanes comprising methacryloxypropyl-functionalized polyhedral silsesquioxanes and polyethene glycol-functionalized polyhedral silsesquioxanes is no more than 2 wt % of the polysiloxane gel.

2. The vertically-stable, single-part curable, thermally conductive and high dispense rate thermal polysiloxane gel of claim 1, wherein the thermally conductive filler is at least 90 wt %.

3. The vertically-stable, single-part curable, thermally conductive and high dispense rate thermal polysiloxane gel of claim 1, wherein the vertical fall of the thermal polysiloxane gel subjected to a vertical position is not higher than 2 mm over a period of time of 100 hours under a temperature of not higher than 150° C.

4. The vertically-stable, single-part curable, thermally conductive and high dispense rate thermal polysiloxane gel of claim 1, wherein the thermal conductivity of the thermal polysiloxane gel is at least 6.0 W/m·K.

5. The vertically-stable, single-part curable, thermally conductive and high dispense rate thermal polysiloxane gel of claim 1, wherein the dispense rate of the thermal polysiloxane gel is at least 10 g/min under 90 psi pressure.

6. The vertically-stable, single-part curable, thermally conductive and high dispense rate thermal polysiloxane gel of claim 1, wherein the thermally conductive filler is selected from $Al_2O_3$, AlN, BN, $SiO_2$, ZnO, MgO, diamond or any combination thereof.

7. A method of preparing the vertically-stable, single-part curable, thermally conductive and high dispense rate polysiloxane gel of claim 1, the method comprising:
   mixing the components of the thermally conductive filler to obtain a homogeneous filler powder;
   adding the silane coupling agent to the homogenous filler powder;
   mixing the mixture of the silane coupling agent and the homogenous filler powder to obtain a thermally conductive filler with silane coupling agent;
   adding the homogeneous thermally conductive filler powder with silane coupling agent to the vinyl-hydride silicone polymer base;
   mixing the mixture of silicone base and thermally conductive filler powder at vacuum condition;

adding dual-functionalized polyhedral silsesquioxanes comprising methacryloxypropyl and polyethene glycol functional groups to the silicone base-thermally conductive filler powder mixture; and further mixing the mixture of silicone base-thermally conductive filler powder and polyhedral silsesquioxanes at vacuum condition.

8. The method of claim 7, wherein the ratio of the vinyl-hydride silicone polymer base to thermally conductive filler powder is in the range of 1:15 to 1:30.

9. The method of claim 7, wherein the thermally conductive filler is selected from $Al_2O_3$, AlN, BN, $SiO_2$, ZnO, MgO, diamond or any combination thereof.

\* \* \* \* \*